United States Patent
Dewar et al.

(10) Patent No.: US 11,205,042 B2
(45) Date of Patent: Dec. 21, 2021

(54) SYSTEM AND METHOD TO TRANSFORM CONTENT AND TO GENERATE A VISUAL INDICATOR OF THAT TRANSFORMATION

(71) Applicant: International Business Machines Corporation, Armonk, NY (US)

(72) Inventors: Ami H. Dewar, Durham, NC (US); Rachael M. Dickens, Raleigh, NC (US); Ethan A. Geyer, Mebane, NC (US); Thomas J. Blanchflower, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 228 days.

(21) Appl. No.: 16/149,426

(22) Filed: Oct. 2, 2018

(65) Prior Publication Data

US 2020/0104348 A1 Apr. 2, 2020

(51) Int. Cl.
| | | |
|---|---|---|
| *G06F 17/00* | (2019.01) | |
| *G06F 40/197* | (2020.01) | |
| *G06F 16/176* | (2019.01) | |
| *G06F 40/166* | (2020.01) | |
| *G06F 40/151* | (2020.01) | |
| *G06F 40/154* | (2020.01) | |

(52) U.S. Cl.
CPC .......... *G06F 40/197* (2020.01); *G06F 16/176* (2019.01); *G06F 40/151* (2020.01); *G06F 40/154* (2020.01); *G06F 40/166* (2020.01)

(58) Field of Classification Search
CPC ..... G06F 16/176; G06F 40/166; G06F 40/197
See application file for complete search history.

(56) References Cited

U.S. PATENT DOCUMENTS

| 7,107,582 B2 * | 9/2006 | Clarke | G06F 16/972 717/143 |
| 8,090,776 B2 * | 1/2012 | Torres | G06F 16/958 709/206 |
| 8,140,983 B2 * | 3/2012 | Brantley | G06F 16/958 715/759 |

(Continued)

OTHER PUBLICATIONS

Michael Reynolds, Your Guide to Collaborative Document Editing with Google Docs, blog.spinweb.net, Oct. 18, 2016, 15 Pages.

*Primary Examiner* — Maikhanh Nguyen
(74) *Attorney, Agent, or Firm* — L. Jeffrey Kelly (57) ABSTRACT

A computer-implemented system, method and computer program product to transform content and to generate a visual indicator of that transformation, by: performing the transformation on the content, wherein the content is transformed from one state to another state; and displaying the visual indicator representative of the transformation adjacent the content; wherein the visual indicator is selected to display the content in a state that existed prior to or at a time when the transformation was performed. As subsequent transformations are performed, additional visual indicators are listed in the order performed. The visual indicator acts as a user interface element that allows a user to view or revert the content to a state that existed prior to or at a time that the transformation was performed. Selection of the visual indicator follows the control to the destination. The visual indicator also serves to relay information sent from the destination.

17 Claims, 6 Drawing Sheets

(56) References Cited

U.S. PATENT DOCUMENTS

| | | | | |
|---|---|---|---|---|
| 8,417,784 | B2* | 4/2013 | Mandre | H04L 51/04 |
| | | | | 709/206 |
| 8,666,937 | B2 | 3/2014 | Wong et al. | |
| 8,788,931 | B1* | 7/2014 | Chen | G06F 40/151 |
| | | | | 715/234 |
| 9,177,055 | B2* | 11/2015 | Choi | G06Q 30/0277 |
| 10,088,983 | B1* | 10/2018 | Qaddoura | H04N 21/23439 |
| 2003/0212746 | A1* | 11/2003 | Fitzpatrick | H04L 12/1827 |
| | | | | 709/206 |
| 2006/0041558 | A1 | 2/2006 | Mccauley et al. | |
| 2006/0095397 | A1* | 5/2006 | Torres | G06F 16/958 |
| 2006/0225091 | A1* | 10/2006 | Facemire | G06F 9/451 |
| | | | | 725/35 |
| 2008/0201438 | A1* | 8/2008 | Mandre | H04L 51/04 |
| | | | | 709/206 |
| 2009/0199103 | A1* | 8/2009 | Brantley | G06F 16/958 |
| | | | | 715/733 |
| 2010/0211461 | A1* | 8/2010 | Choi | G06Q 30/0277 |
| | | | | 705/14.52 |
| 2011/0283239 | A1* | 11/2011 | Krishnan | G06F 3/04847 |
| | | | | 715/853 |
| 2014/0195899 | A1 | 7/2014 | Bastide et al. | |
| 2014/0379855 | A1 | 12/2014 | Sahota et al. | |
| 2015/0106426 | A1 | 4/2015 | Antipa | |
| 2016/0073163 | A1* | 3/2016 | Malik | H04N 7/17318 |
| | | | | 725/34 |
| 2016/0110029 | A1 | 4/2016 | Megiddo et al. | |
| 2017/0078745 | A1* | 3/2017 | Malik | H04N 7/17318 |
| 2017/0300464 | A1 | 10/2017 | Hunter et al. | |
| 2019/0205014 | A1* | 7/2019 | Sun | G06F 3/04842 |

\* cited by examiner

SYSTEM AND METHOD TO TRANSFORM CONTENT AND TO GENERATE A VISUAL INDICATOR OF THAT TRANSFORMATION

BACKGROUND

The present invention relates generally to a system and method to transform content and to generate a visual indicator of that transformation.

Currently, it is not uncommon for one piece of content to be transformed or provide the basis for multiple pieces of content. It could be as simple as some notes that a user was taking that are shared as an email, in the context of a note-taking tool, or the same notes could be published as a blog post, again in the context of the note-taking tool.

However, when multiple users are interacting with a single piece of content, such as the case with collaborative or co-editing systems, they may not be aware of the transformative actions performed against the single piece of content and its resulting states. For example, users may not have any way of knowing what exactly was shared and/or published at each state.

There is also a universal challenge with cloud-based systems that save content updates automatically (sometimes on a keystroke), and thus eliminate a way to access versions of the content by updates. For example, there is a lack of any visual indicator that represents what transformation has occurred, or that provides a way to return the content to a state that existed prior to or at the time of that transformation.

What is needed, then, are improved systems and methods for transforming content and for generating a visual indicator of that transformation. The present invention satisfies this need.

SUMMARY

The invention provided herein has many embodiments useful, for example, in implementing a system, method and computer program product to transform content and to generate a visual indicator of that transformation, by: performing the transformation on the content, wherein the content is transformed from one state to another state; and displaying the visual indicator representative of the transformation adjacent the content; wherein the visual indicator is selected to display the content in a state that existed prior to or at a time when the transformation was performed.

The content may be transformed by being shared via email, shared with a person, shared with a community, saved as a document, sent to a file hosting service, or published to a web page. As subsequent transformations are performed, additional visual indicators are listed in the order performed.

The visual indicator acts as a user interface element that allows a user to view or revert the content to a state that existed prior to or at a time that the transformation was performed. As a result, the visual indicator provides a way for a user to access different versions of the content.

The visual indicator identifies a destination that performed the transformation on the content, wherein the visual indicator is a control, so that selection of the visual indicator follows the control to the destination. The visual indicator also serves as a control to relay information sent from the destination.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and in which is shown by way of illustration one or more specific embodiments in which the invention may be practiced. It is to be understood that other embodiments may be utilized, and structural and functional changes may be made without departing from the scope of the present invention.

Overview

The present invention discloses a system and method to transform content and to generate a visual indicator of that transformation. Specifically, this disclosure describes a visual indicator that the content has been transformed, wherein the visual indicator also acts as a user interface (UI) element that allows a user to view or revert the content to a state that existed prior to or at the time of the transformation. The visual indicator thus provides a way for a user to access logical versions of the content that are otherwise eliminated with cloud-based systems that save content updates automatically.

Cloud Computing Environment

Figure 1:
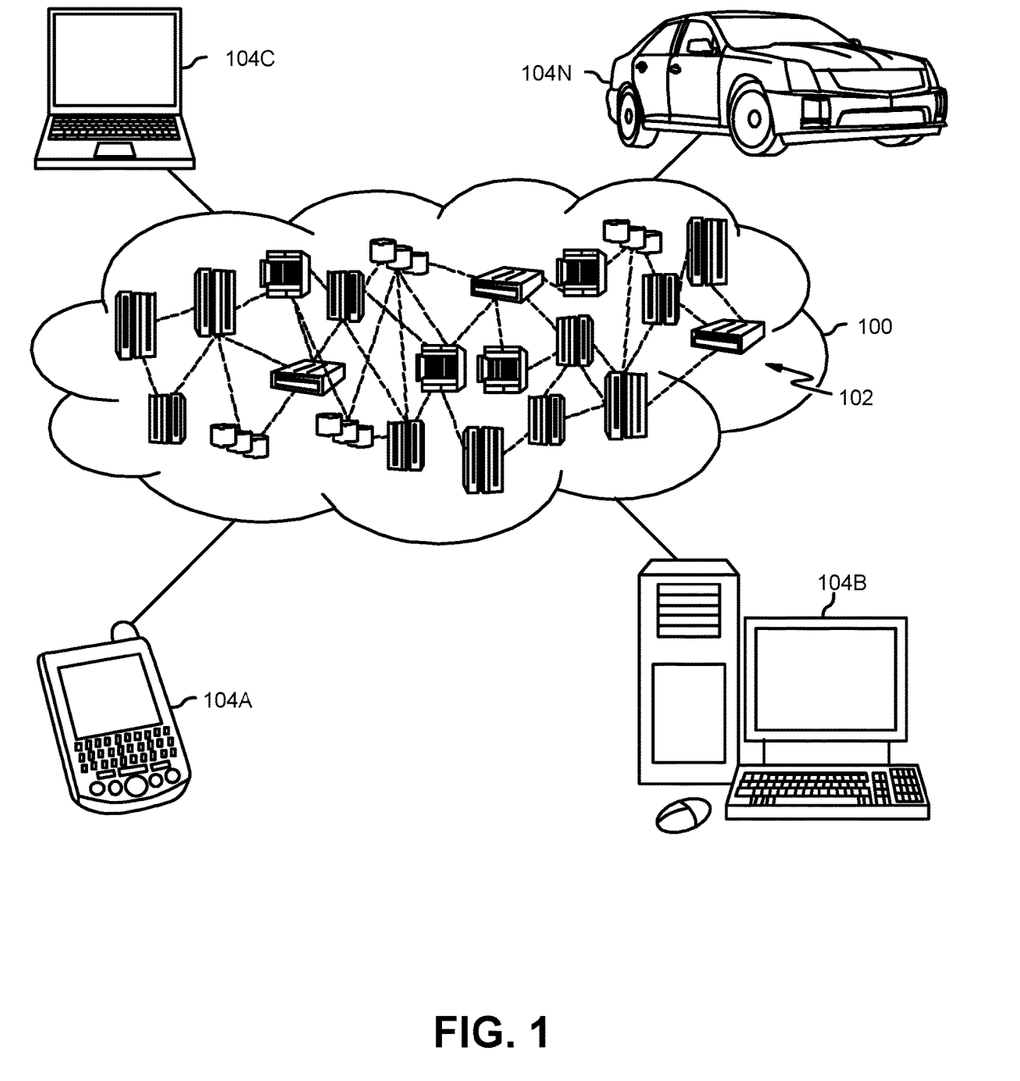
FIG. 1 is a pictorial representation of an illustrative cloud computing environment used for implementing the system and method to transform content and to generate a visual indicator of that transformation.

FIG. 1 is a pictorial representation of an illustrative cloud computing environment 100 used for implementing the system and method to transform content and to generate a visual indicator of that transformation, according to one embodiment.

As shown, a cloud computing environment 100 includes one or more cloud computing nodes 102 with which local computing devices used by cloud consumers, such as, for example, personal digital assistant (PDA) or cellular telephone 104A, desktop computer 104B, laptop computer 104C, and/or automobile computer system 104N may communicate. Nodes 102 may communicate with one another. They may be grouped (not shown) physically or virtually, in one or more networks, such as Private, Community, Public, or Hybrid clouds, or a combination thereof. This allows cloud computing environment 100 to offer infrastructure, platforms and/or software as services for which a cloud consumer does not need to maintain resources on a local computing device. It is understood that the types of computing devices 104A-N shown in FIG. 1 are intended to be illustrative only and that computing nodes 102 and cloud computing environment 100 can communicate with any type of computerized device over any type of network and/or network addressable connection (e.g., using a web browser).

The computing nodes 102 and/or computing devices 104A-N perform various functions and steps as described in more detail below.

System Description

Figure 2:
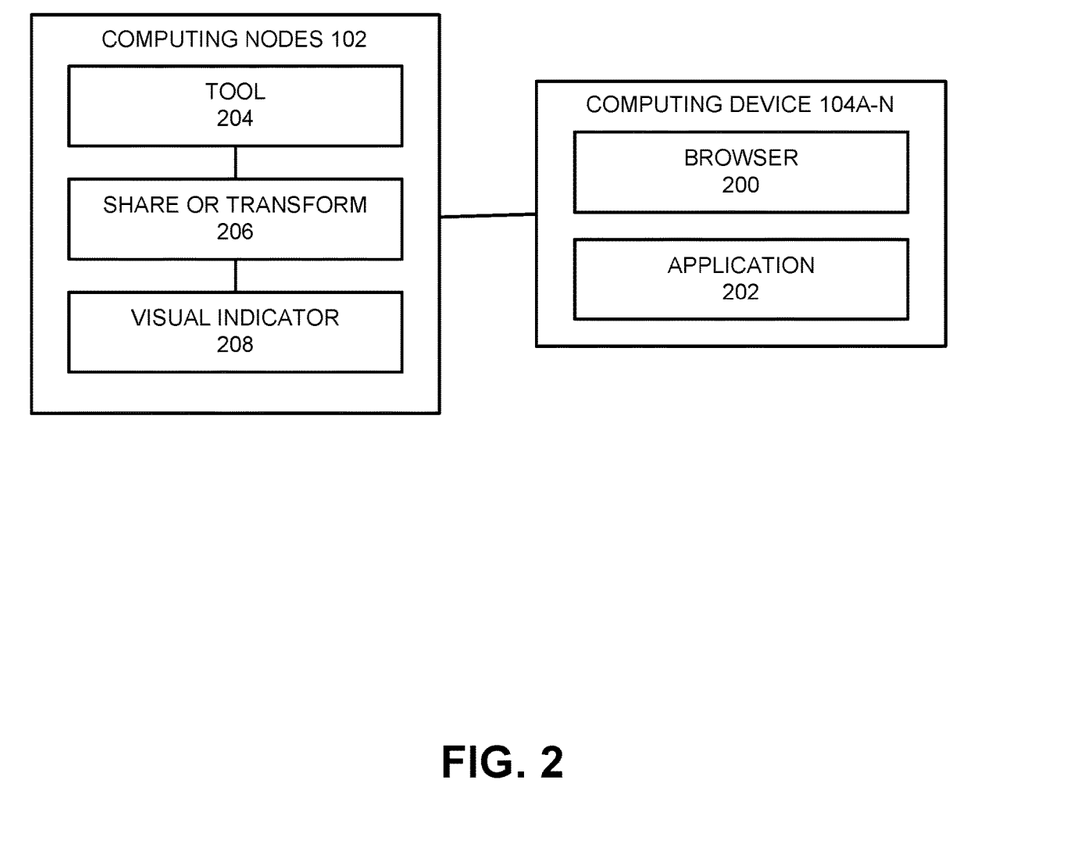
FIG. 2 is a block diagram illustrating how the system and method to transform content and to generate a visual indicator of that transformation are implemented, according to one embodiment.

FIG. 2 is a block diagram illustrating how the system and method to transform content and to generate a visual indicator of that transformation are implemented, according to one embodiment. In this embodiment, the system and method are implemented as follows:

- a browser 200 or application 202 executed on a user's computing device 104A-N invokes a tool for transforming the content; and
- a plurality of modules 204-208 executed on the computing nodes 102 perform the functions or steps of the tool for transforming the content.

In alternative embodiments, these functions and steps may be wholly or partially performed on the computing nodes 102 and/or computing devices 104A-N.

In a Tool step or function 204, the user invokes a tool executed by the computing nodes 102 capable of transforming the content. The tool may be a tool used by one user, or may be a collaborative tool where the content is shared among a plurality of users. In this step or function 204, a user interface of the tool is displayed on one or more of the computing devices 104A-N for the users accessing the tool. The user interface displays the content, which may comprise text, images, etc., as well as other information.

In a Share or Transform step or function 206, upon activating a control in the user interface of the tool, a menu is displayed on the computing devices 104A-N that allows the users accessing the tool to perform one or more transformations on the content. Specifically, the content is transformed from one state to another state, for example, the content is transformed by being shared via email, shared with a person, shared with a community, saved as a document, sent to a file hosting service, or published to a web page, among other actions.

In a Visual Indicator step or function 208, after the content has been transformed from one state to another state, a visual indicator is displayed on the computing devices 104A-N adjacent the content that identifies the transformation. The visual indicator is a control, so that selection of the visual indicator allows a user to view or revert the content to a state that existed prior to or at a time of the transformation.

The visual indicator also identifies a destination, i.e., tool, program, function, web site, etc., that performed the transformation on the content, so that selection of the visual indicator also follows the control to the destination, for example, to view or revert the content to a state that existed prior to or at a time of the transformation and/or to invoke the transformation again. Similarly, the visual indicator also serves as a control to relay information sent from the destination.

The same would be true for subsequent transformations. As subsequent transformations are performed, additional visual indicators are listed in the order performed in the user interface displayed by the computing devices 104A-N. The selection of these additional visual indicators allows the users to view or revert the content to a state that existed prior to or at the time of the subsequent transformations. In addition, the selection of these additional visual indicators also provides the users with the ability to follow the control to the associated destinations. Similarly, these additional visual indicators may also serve as a control to relay information sent from the associated destinations.

These steps 204-208 may be repeated as necessary, and any one or more of the steps 204-208 may be omitted as required.

Use Case

Consider the following use case to transform content and to generate a visual indicator of that transformation. This use case is illustrated in FIGS. 3A, 3B and 3C.

Figure 3A:
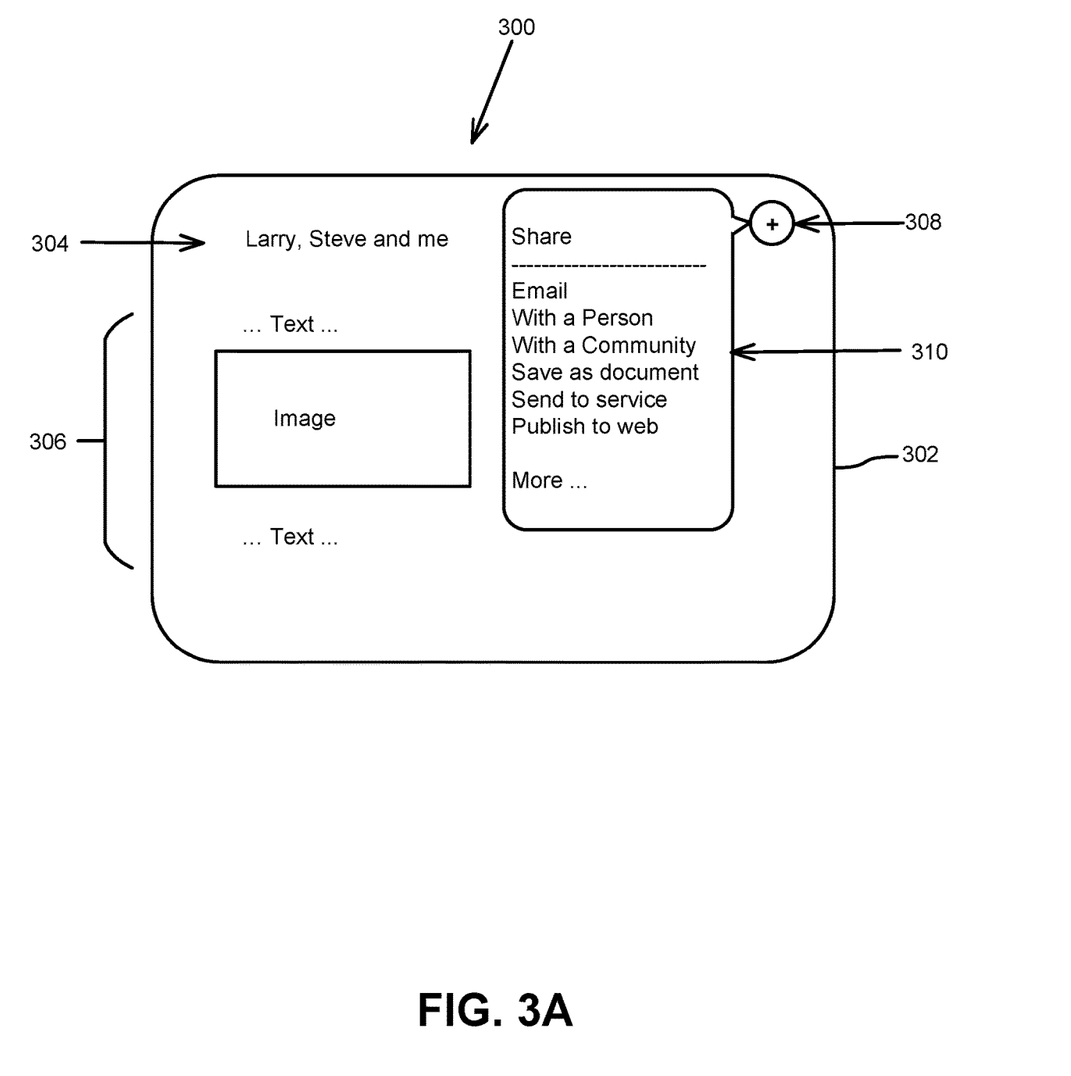
FIGS. 3A, 3B and 3C illustrate a use case for the system and method to transform content and to generate a visual indicator of that transformation, according to one embodiment.

FIG. 3A illustrates a collaborative note-taking tool 300. In this example, a user interface 302 of the tool 300 is displayed on one or more computing devices 104A-N for the users accessing the tool 300. The user interface 302 displays names 304 for the users, as well as content 306, which may comprise text, images, etc. Upon activating a control 308 in the user interface 302, a menu 310 appears that allows the users accessing the tool 300 to transform the content 306. In this example, the content 306 may be transformed from one state to another state, e.g., from the note-taking tool 300 to being shared via email, shared with a person, shared with a community, saved as a document, sent to a file hosting service, published to a web page, along with more actions. In this example, one or more of the users decides to share the content 306 with an email.

Figure 3B:
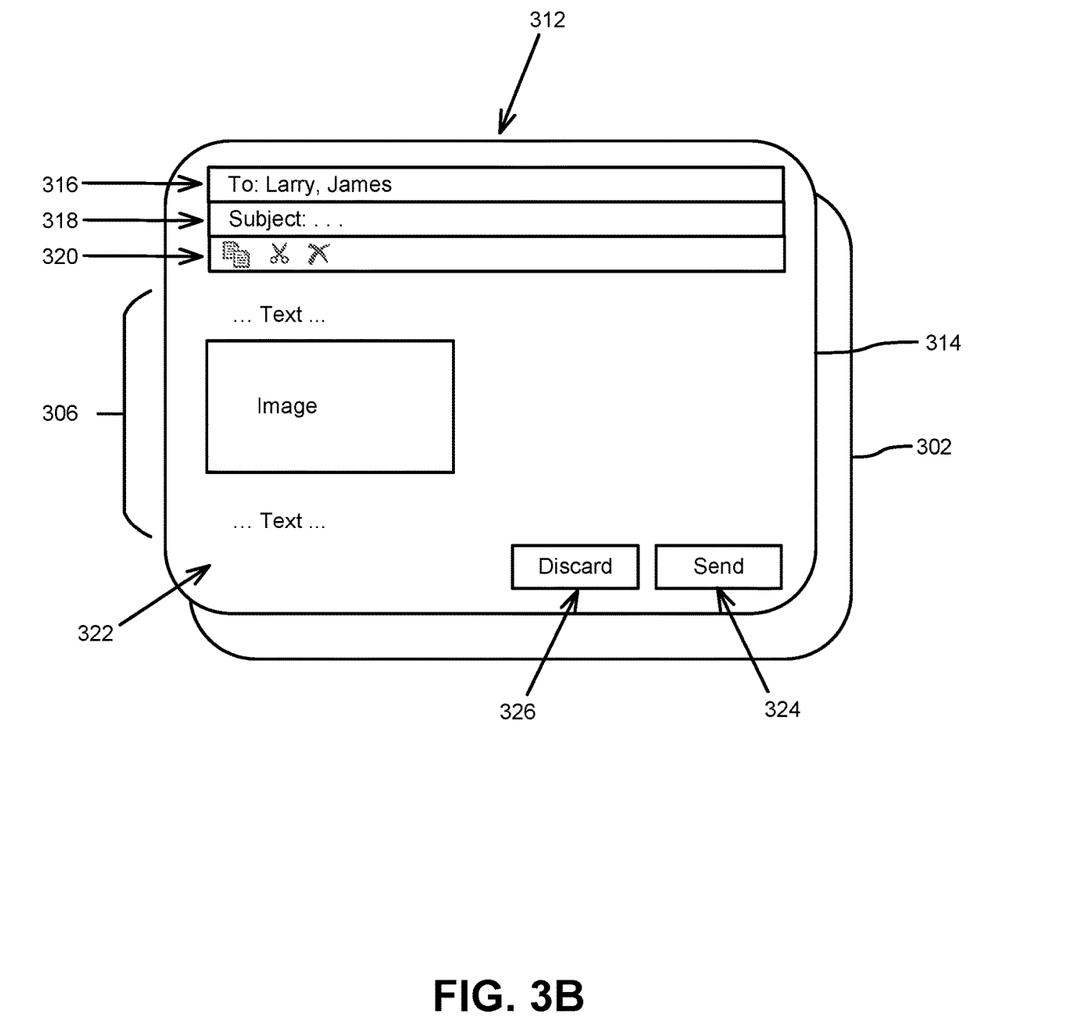

FIG. 3B illustrates an email client 312 that is displayed when the content 306 is shared with an email. In this example, a user interface 314 of the email client 312 is displayed on one or more of the computing devices 104A-N for one of the users accessing the tool 300. The user interface 314 displays a "To:" field 316, a "Subject:" field 318, and a toolbar 320. The content 306 has been transformed into a body 322 of the email, and may be edited further by the user. Upon activating a "Send" button 324 in the user interface 314, the email is sent to the addresses in the "To:" field 316; while activating a "Discard" button 326 in the user interface 314 cancels the operation.

Figure 3C:
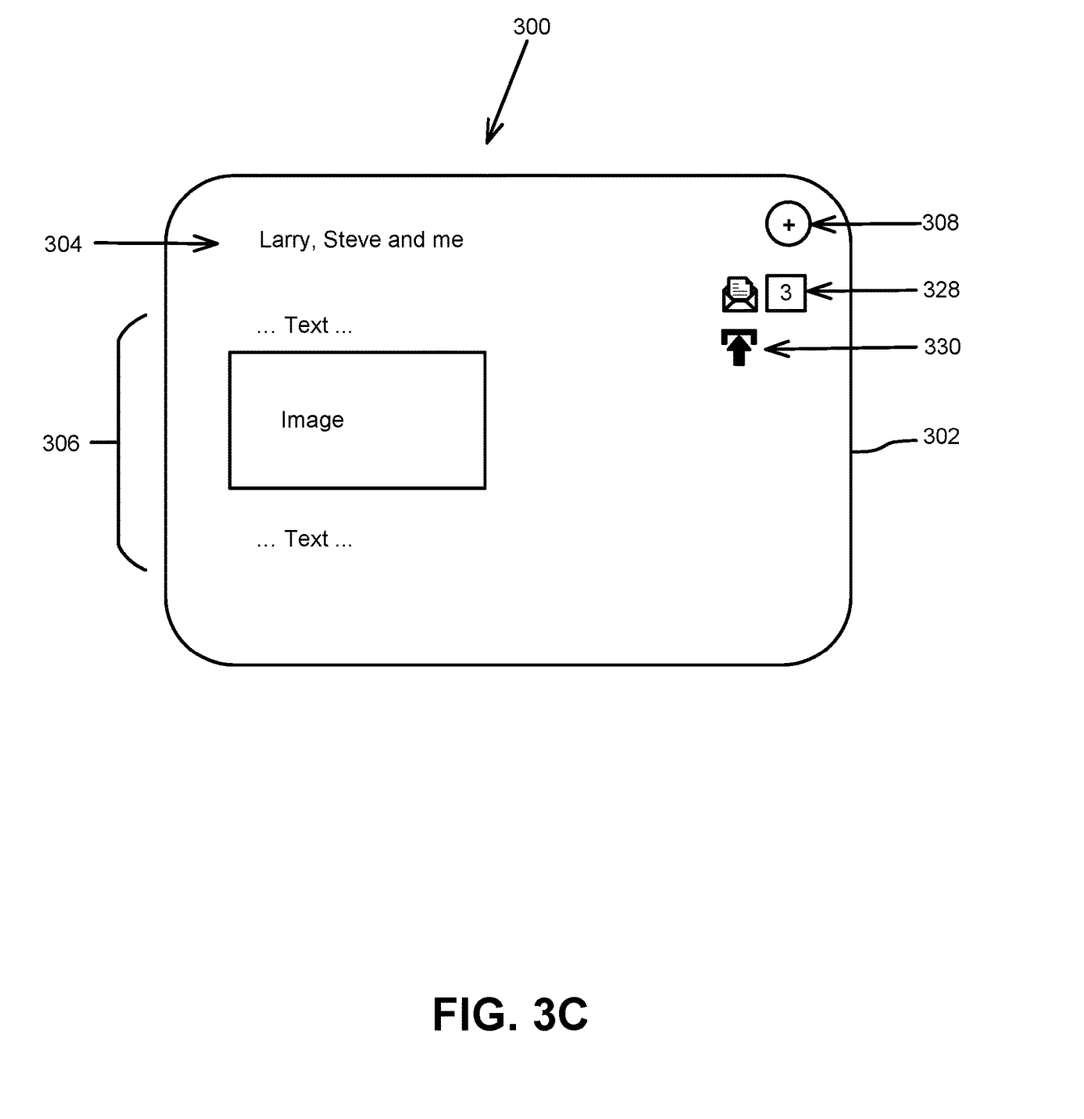

FIG. 3C illustrates the collaborative note-taking tool 300 after the content 306 has been shared with an email. The user interface 302 now displays a visual indicator 328 of the destination, which is an envelope indicating that the content 306 has been shared as an email, wherein the selection of the visual indicator 328 provides the ability to follow the control to the destination, namely, to again invoke the email client 312 displaying the content 306 as the body 322.

The visual indicator 328 also serves as a control to relay information that was sent from the destination. For example, the visual indicator 328 includes the number "3", indicating that there are three email messages in the thread containing the content 306.

The same would be true for subsequent transformations. For example, the additional visual indicator 330 indicates that, following the sharing of the content 306 as the email, the content 306 was uploaded to a cloud-based file hosting service or other repository. As subsequent transformations are performed, these additional visual indicators 330 are listed in the order performed in the user interface 302. The selection of these additional visual indicators 330 also provide the ability to follow the control to the destinations, which allows the users to view the content 306 in a state existing prior to or at the time that the transformations were performed. Similarly, these additional visual indicators 330 may also serve as a control to relay information that was sent from the destinations.

Cloud Computing

It is to be understood that this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring again to FIG. 1, illustrative cloud computing environment 100 is depicted. As shown, cloud computing environment 100 includes one or more cloud computing nodes 102 with which local computing devices used by cloud consumers, such as, for example, personal digital assistant (PDA) or cellular telephone 104A, desktop computer 104B, laptop computer 104C, and/or automobile computer system 104N may communicate. Nodes 102 may communicate with one another. They may be grouped (not shown) physically or virtually, in one or more networks, such as Private, Community, Public, or Hybrid clouds as described hereinabove, or a combination thereof. This allows cloud computing environment 100 to offer infrastructure, platforms and/or software as services for which a cloud consumer does not need to maintain resources on a local computing device. It is understood that the types of computing devices 104A-N shown in FIG. 1 are intended to be illustrative only and that computing nodes 102 and cloud computing environment 100 can communicate with any type of computerized device over any type of network and/or network addressable connection (e.g., using a web browser).

Figure 4:
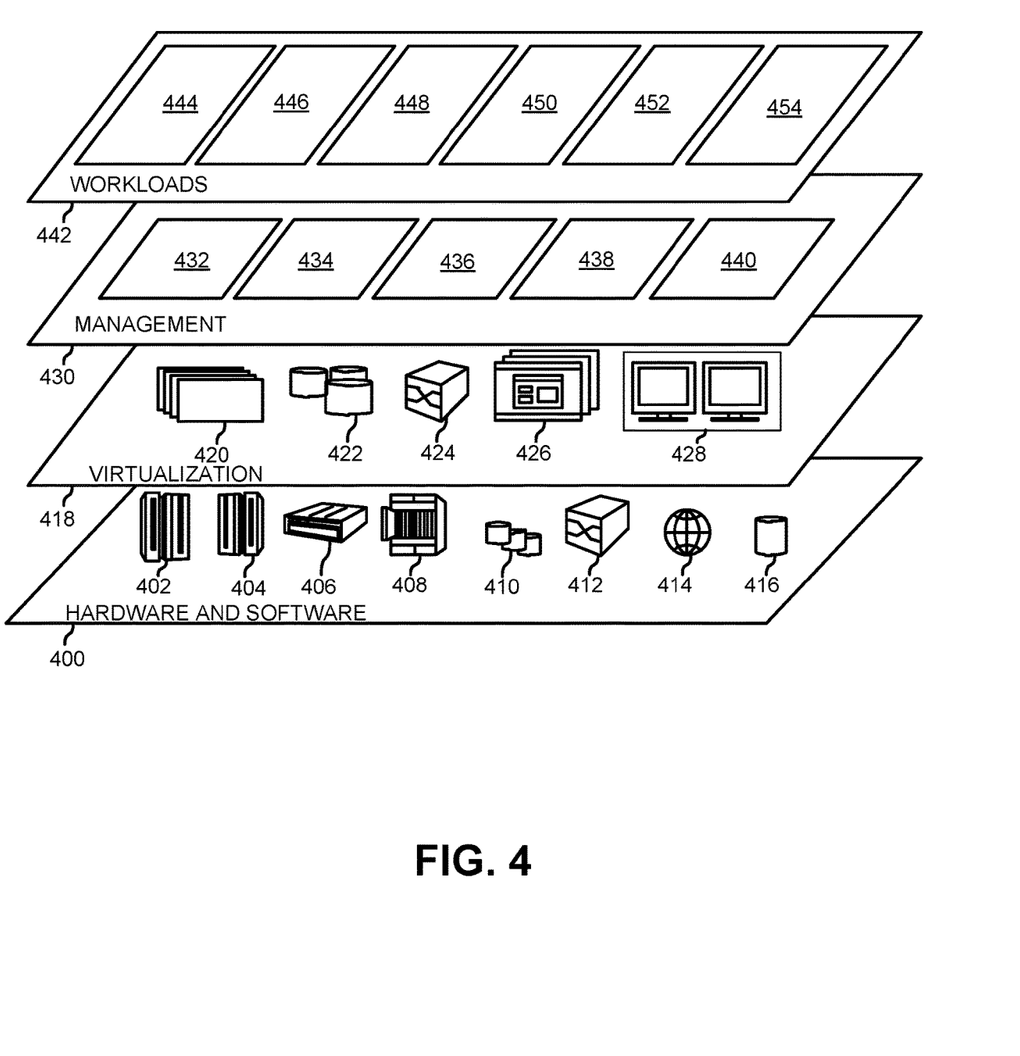
FIG. 4 illustrates a set of functional abstraction layers provided by the cloud computing environment.

Referring now to FIG. 4, a set of functional abstraction layers provided by cloud computing environment 100 (FIG. 1) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 400 includes hardware and software components. Examples of hardware components include: one or more computers such as mainframes 402, RISC (Reduced Instruction Set Computer) architecture based servers 404, servers 406, and blade servers 408; storage devices 410; and networks and networking components 412. In some embodiments, software components include network application server software 414 and database software 416.

Virtualization layer 418 provides an abstraction layer from which the following examples of virtual entities may be provided: virtual servers 420; virtual storage 422; virtual networks 424, including virtual private networks; virtual applications and operating systems 426; and virtual clients 428.

In one example, management layer 430 may provide the functions described above. Resource provisioning 432 provides dynamic procurement of computing resources and other resources that are utilized to perform tasks within the cloud computing environment 100. Metering and pricing 434 provide cost tracking as resources are utilized within the cloud computing environment 100, and billing or invoicing for consumption of these resources. In one example, these resources may include application software licenses. Security provides identity verification for cloud consumers and tasks, as well as protection for data and other resources. User portal 436 provides access to the cloud computing environment 100 for consumers and system administrators. Service level management 438, which includes containers, provides cloud computing resource allocation and management such that required service levels are met. Service Level Agreement (SLA) planning and fulfillment 440 provide pre-arrangement for, and procurement of, cloud computing resources for which a future requirement is anticipated in accordance with an SLA.

Workloads layer 442 provides examples of functionality for which the cloud computing environment 100 may be utilized. Examples of workloads, tasks and functions which may be provided from this layer include: mapping and navigation 444; software development and lifecycle management 446; virtual classroom education delivery 448; data analytics processing 450; transaction processing 452; etc. More specifically, this layer includes the workloads, tasks and functions 454 to transform content and to generate a visual indicator of that transformation.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

Conclusion

This concludes the description of the various embodiments of the present invention. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Since many embodiments of the invention can be made without departing from the spirit and scope of the invention, the invention resides in the claims hereinafter appended.

What is claimed is:

1. A computer-implemented system, comprising:
   one or more computers programmed to transform content and to generate a visual indicator of that transformation, by:
   performing the transformation on the content, wherein the content is transformed from one state to another state; and
   displaying the visual indicator representative of the transformation adjacent the content;
   wherein the visual indicator is selected to display the content in a state that existed prior to or at a time when the transformation was performed; and
   wherein the visual indicator acts as a user interface element that allows a user to view or revert the content to a state that existed prior to or at a time that the transformation was performed.

2. The system of claim 1, wherein the content is transformed by being shared via email, shared with a person, shared with a community, posted to a web page, saved as a document, or sent to a file hosting service.

3. The system of claim 1, wherein the visual indicator provides a way for a user to access different versions of the content.

4. The system of claim 1, wherein the visual indicator identifies a destination that performed the transformation on the content.

5. The system of claim 4, wherein the visual indicator is a control, so that selection of the visual indicator follows the control to the destination.

6. The system of claim 4, wherein the visual indicator serves as a control to relay information sent from the destination.

7. The system of claim 1, wherein, as subsequent transformations are performed, additional visual indicators are listed in the order performed.

8. The system of claim 1, wherein the content is shared among a plurality of users and the visual indicator identifies the transformation invoked by one or more of the plurality of users.

9. A computer-implemented method, comprising:
   transforming content and generating a visual indicator of that transformation on one or more computers, by:
   performing the transformation on the content, wherein the content is transformed from one state to another state; and
   displaying the visual indicator representative of the transformation adjacent the content;
   wherein the visual indicator is selected to display the content in a state that existed prior to or at a time when the transformation was performed; and
   wherein the visual indicator acts as a user interface element that allows a user to view or revert the content to a state that existed prior to or at a time that the transformation was performed.

10. The method of claim 9, wherein the content is transformed by being shared via email, shared with a person, shared with a community, posted to a web page, saved as a document, or sent to a file hosting service.

11. The method of claim 9, wherein the visual indicator provides a way for a user to access different versions of the content.

12. The method of claim 9, wherein the visual indicator identifies a destination that performed the transformation on the content.

13. The method of claim 12, wherein the visual indicator is a control, so that selection of the visual indicator follows the control to the destination.

14. The method of claim 12, wherein the visual indicator serves as a control to relay information sent from the destination.

15. The method of claim 9, wherein, as subsequent transformations are performed, additional visual indicators are listed in the order performed.

16. The method of claim 9, wherein the content is shared among a plurality of users and the visual indicator identifies the transformation invoked by one or more of the plurality of users.

17. A computer program product, the computer program product comprising a computer readable storage medium having program instructions embodied therewith, the program instructions executable by one or more computers to cause the computers to perform a method, comprising:
   transforming content and generating a visual indicator of that transformation on one or more computers, by:
   performing the transformation on the content, wherein the content is transformed from one state to another state; and
   displaying the visual indicator representative of the transformation adjacent the content;
   wherein the visual indicator is selected to display the content in a state that existed prior to or at a time when the transformation was performed; and wherein the visual indicator acts as a user interface element that allows a user to view or revert the content to a state that existed prior to or at a time that the transformation was performed.

* * * * *